(12) United States Patent
MacFarlane et al.

(10) Patent No.: US 7,014,104 B2
(45) Date of Patent: Mar. 21, 2006

(54) GIFT MATCHING METHOD

(75) Inventors: Jackie MacFarlane, Parker, CO (US); Henry M. Abelman, Roswell, CO (US); Kenneth Algiene, Littleton, CO (US)

(73) Assignee: First Data Corporation, Englewood, CO (US)

( * ) Notice: Subject to any disclaimer, the term of this patent is extended or adjusted under 35 U.S.C. 154(b) by 0 days.

(21) Appl. No.: 10/306,906

(22) Filed: Nov. 27, 2002

(65) Prior Publication Data

US 2003/0225689 A1 Dec. 4, 2003

Related U.S. Application Data

(63) Continuation-in-part of application No. 10/159,784, filed on May 31, 2002.

(51) Int. Cl.
*G06F 17/60* (2006.01)

(52) U.S. Cl. ...................................... 235/379; 235/380
(58) Field of Classification Search ................ 235/379, 235/380; 705/35, 36, 39
See application file for complete search history.

(56) References Cited

U.S. PATENT DOCUMENTS

| | | | |
|---|---|---|---|
| 5,466,919 A * | 11/1995 | Hovakimian | 705/17 |
| 5,555,496 A | 9/1996 | Tackbary et al. | |
| 5,621,640 A * | 4/1997 | Burke | 705/14 |
| 5,960,412 A | 9/1999 | Tackbary et al. | |
| 6,052,674 A * | 4/2000 | Zervides et al. | 705/40 |
| 6,112,191 A * | 8/2000 | Burke | 705/41 |
| 6,246,996 B1 | 6/2001 | Stein et al. | |
| 6,347,305 B1 | 2/2002 | Watkins | |
| 6,519,573 B1 * | 2/2003 | Shade et al. | 705/26 |
| 6,581,041 B1 * | 6/2003 | Canney | 705/35 |
| 2002/0038225 A1 * | 3/2002 | Klasky et al. | 705/1 |

FOREIGN PATENT DOCUMENTS

EP 0 949 596 A2 10/1999

OTHER PUBLICATIONS

Confinity, Inc., *PayPal.com, How PayPal.com Works*, downloaded from website http://www.paypal.com/ on Feb. 7, 2000.
Idealab Company, PayMe.com, downloaded from website https://ssl/idealab.com/ on Feb. 16, 2000.
PR Newswire, *GiftSpot.com Simplifies Gift-Giving on the Internet*, downloaded from website http//www.proquest.umi.com.

* cited by examiner

*Primary Examiner*—Ahshik Kim
(74) *Attorney, Agent, or Firm*—Townsend and Townsend and Crew LLP

(57) ABSTRACT

A method for electronically transferring an amount of money from an initiator to a receiver is disclosed. The amount is enhanced or matched by a matching party. In one step, transfer information is received from the initiator. The transfer information includes at least two of a third party identifier, a second party identifier and the amount. The transfer information is analyzed. An enhancing amount to transfer from the matching party to the receiver is determined. Money is transferred to the receiver that corresponds to the amount and the enhancing amount.

27 Claims, 12 Drawing Sheets

GIFT MATCHING METHOD

This application claims domestic priority is a Continuation-in part to U.S. application patent Ser. No. 10/159,784, filed on May 31, 2002, which is incorporated herein in its entirety.

BACKGROUND OF THE INVENTION

This invention relates in general to money transfer methods and, more specifically, to systems and methods for matched money transfers.

Charities have embraced the Internet and other technologies that make raising money easier. Many charities have web sites, for example. Any technology that allows realizing donations or converting pledge is eagerly adopted by charities. For example, many charities accept credit cards today or allow periodic automatic debits to a donors account. Also, some web sites have specialized in providing information on a number of charities to assist others in selecting the best charity. Information on the purpose of the various charities, their efficiency and overhead, etc. may be provided to potential donors.

Corporations or other organizations occasionally offer gift matching programs to their employees or members. For example, a corporation may double any gift by also providing an equal amount to the receiver of the gift or donation. In this way, the organization can donate in a manner similar to its members.

In some countries, charitable gifts are given favorable tax treatment for individuals and/or businesses. Under some circumstances, proof of the gift may be required by the taxing authority. Canceled checks or receipts are useful for this purpose.

BRIEF DESCRIPTION OF THE DRAWINGS

The present invention is described in conjunction with the appended figures.

Figure 1:
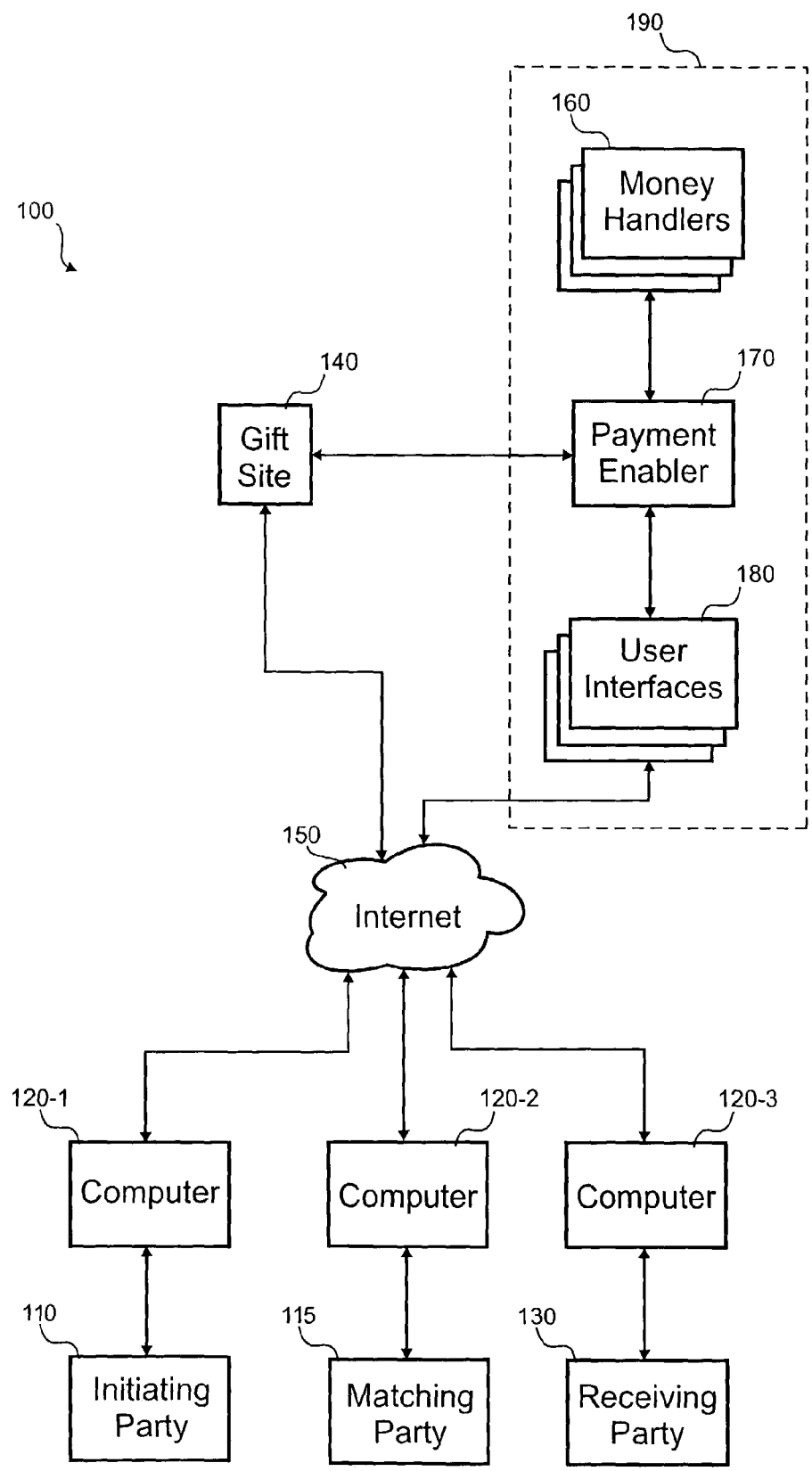
FIG. 1 is a block diagram of an embodiment of an on-line transfer matching system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION OF THE SPECIFIC EMBODIMENTS

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Organizations, such as businesses, often match the charitable gifts of employees within some guidelines. A conventional paper form asking for an employee identifier and information on the charity might conventionally be used in organizations today. In one embodiment of the present invention, the information on the conventional paper form is entered on-line. The form could be customized with branding and other information for the particular organization or charity. Further customizations could include the charities available and the amounts to give, etc. In some embodiments, the form is eliminated altogether and the organization transfers matching funds either automatically or after some manual review.

The employee can use a credit card, a debit card, a bank account, or retail location to fund the gift by interfacing with or providing information about the appropriate handler in one embodiment. The charity could have a stored value account with the payment enabler or a separate bank account. When the form information is entered satisfactorily, the funds are transferred from the employee's handler along with matching funds from the employer's handler. The information entered and other stored information is displayed for printing a receipt of the transaction that could assist in tax preparation, for example. These receipts could include a tax receipt for the initiator or matching party and a form with the particulars of the match. The employer could accept the form as a record of the transaction or could receive some or all information electronically in a message. For messages, a messaging function could be used to notify the employer and/or employee.

In one embodiment, the present invention provides a method for electronically transferring an amount of money from an initiator to a receiver. The amount is enhanced or matched by a matching party. In one step, transfer information is received from the initiator. The transfer information includes at least two of a third party identifier, a second party identifier and the amount. The transfer information is analyzed. An enhancing amount to transfer from the matching party to the receiver is determined. Money is transferred to the receiver that corresponds to the amount and the enhancing amount.

In another embodiment, the present invention provides a method for electronically transferring money. In one step, transfer information is received from a initiator. The transfer information comprises a receiver identifier, a matching party identifier and a first amount. The transfer information is analyzed. A second amount to transfer from the matching party to the receiver is determined, where the second amount is algorithmically related to the first amount. The second amount is checked. A third amount corresponding to the first amount is transferred to the receiver. A fourth amount corresponding to the second amount is also transferred to the receiver, based, at least in part, on results of the checking of the second amount.

In yet another embodiment, the present invention provides a method for electronically transferring money. In one step, transfer information is received from a initiator, where the transfer information comprises a third party identifier, a second party identifier and a first amount. A second amount to transfer from a matching party to the receiver is determined, where the second amount is algorithmically related to the first amount. The second amount is checked against a predetermined criteria. A third amount corresponding to the first amount is transferred to the receiver. A fourth amount corresponding to the second amount is also transferred to the receiver, based at least in part on results of the checking against the predetermined criteria.

Referring first to FIG. 1, a block diagram of an embodiment of an on-line transfer matching system 100 is shown. Included in the system 100 are a gift site 140, an electronic money transfer system 190, an initiating party 110, a matching party 115, and a receiving party 130. Respective computers 120 interface the initiator 110, matching party 115 and receiver 130 to the Internet 150 or other wide area network such that they can interact with the gift site 140 and the money transfer system 190. Money handlers 160, a payment enabler 170 and user interfaces 180 comprise the money transfer system 190.

The gift site 140 is a web site on the Internet 150 and may include servers and other computers as is well known in the art. The initiator 110 points their browser to the gift site 140 to choose a transfer amount to send to the receiver 130. The matching party 115 can interact with the gift site 140 to configure gift matching, even though such configuration is unnecessary in some embodiments. The receiver 130 interacts with the gift site 140 to provide information about the receiver 130 and configure transfer out particulars. Although this embodiment shows the gift site 140 being separate from the money transfer system 190, other embodiments could combine these into the same location or spread portions among any number of locations. The gift site 140 may be associated with the matching party 115, the receiving party 130, the money transfer system 190, or some combination thereof.

The transfer system 190 works in concert with the gift site 140 to provide the transfer of funds between the parties 110, 115, 130. This embodiment uses a stored value fund model, but a payment gateway that accepts credit cards, electronic checks and/or money transfers could be used in some embodiments. In some cases, the receiver 130 may be a qualified merchant such that payment can be processed at the gift site 140 by the receiver 130. In some cases, the initiator 110 chooses a type of electronic gift that does not require the receiver 130 to interact with the transfer system 190, such as with a gift certificate. Money handlers 160 are used to payin money for initiator 110 and matching party 115. The user interfaces 180 provide a variety of ways for the initiator 110, matching party 115, and receiver 130 to interact with the transfer system 190.

The matching party is not limited to organizations matching donations. The matching party could be an individual wishing to enhance donations or could be someone wishing to help others pay bills or purchase items. In other embodiments, a promotion could match payments like a discount coupon or cash rebate. For example, the initiator 110 could pay for a car with the manufacturer 115 providing an incentive on that car, where the selling party is the receiver 130. Insurance companies could collect deductibles in this way such that the insurance company 115 will pay the covered amount in a claim if the insured 110 pays the deductible or co-payment to the doctor 130. In another example, an initiator 110 could pay a bill for a needy receiver 130 that is enhanced by a third party like their employer or a government agency, for example. In some cases, the initiator 110 and the matching party 115 can be interchanged within the scope of this invention.

Figure 2:
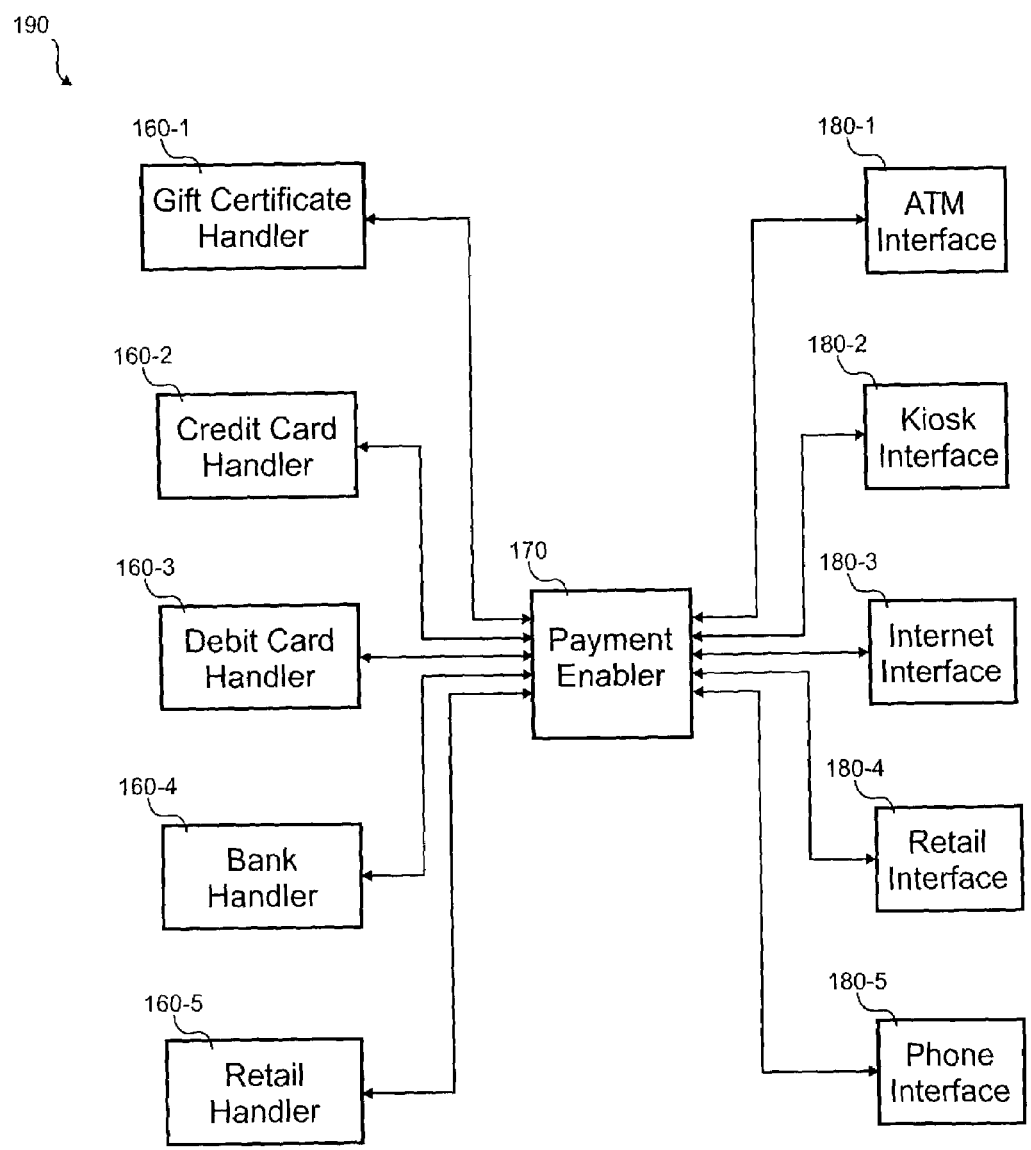
FIG. 2 is a block diagram of an embodiment of an electronic money transfer system.

With reference to FIG. 2, a block diagram of an embodiment of the electronic money transfer system 190 is shown. In this embodiment, five different handlers 160 and five different user interfaces 180 are shown. Other embodiments could have more or less handlers 160 and interfaces 180. Each of the handlers 160 allows users to add and remove money or otherwise configure the payment enabler 170. The user interfaces 180 allow interaction with the payment enabler 170 to transfer money to and from a stored value fund. Normally, the receiver 130 can choose the handler 160 for payouts, but in some circumstances, the initiator 110 can choose the handler 160 the receiver uses for payouts. For example, the initiator 110 may specify a particular gift certificate handler 160-1 that only allows the certificate to be used at a particular store for merchandise and/or services. As part of a promotion, the matching party 115 may increase the value of the gift certificate, for example.

The credit and debit card handlers 160-2, 160-3 behave largely the same. Both can be used to add money into the payment enabler 170. In other embodiments, these handlers 160-2, 160-3 can also be used to remove money from the payment enabler 170 also, for example, to purchase a prepaid credit/debit card, to pay down a balance on a credit card, or to add credit to a bank account associated with a debit card. To use these handlers 160-2, 160-3, the payment enabler 170 stores the information for receiving money from credit or debit cards in the conventional way, such as the account number, expiration date, name, and/or PIN. Similar information may be used when paying-out money to a credit/debit card.

The bank handler 160-4 allows electronic funds transfer (EFT) of money to a bank account of the user. The user enters the account number and routing information into the payment enabler 170 with a user interface 180 to facilitate adding and removing of money from the payment enabler with this handler 160-4. In one embodiment, an automated teller machine (ATM) could integrate the bank handler 160-4 along with an ATM interface 180-1 to allow adding and removing funds along with interfacing with the payment enabler 170. Another embodiment uses a bank handler 160-4 branch location as a retail interface 180-4 for interacting with the payment enabler 170. Some embodiments could wire money into a bank account of the user instead of an EFT.

The retail handler 160-5 typically corresponds to a retail location 500 that may wire money, print money orders and/or cash checks. Money may be sent to the retail handler 160-5, whereafter the receiver 130 is issued cash or a negotiable instrument for that money. Money can be added to the system 100 by a initiating or matching party 110, 115 with the retail handler 160-5 also. For example, the user may give cash to the agent at the retail location who enters a credit into the payment enabler 170. The user could further specify to the agent a receiver 130 who should get the money and a matching party 115 who could enhance the amount. A retail interface 180-4 at the retail location 500 is used by the agent to indicate to the payment enabler 170 that the money has been received from the initiator 110 or matching party 115. Through a retail handler 160-5, an initiator 110 or matching party 115 could use the transfer matching system 100 without any knowledge of computers or without any debit/credit card or bank account.

Gift certificates are dispensed through one or more gift certificate handlers 160-6. The gift certificate can be limited to merchandise and/or services from a single store or a group of stores. In some cases, the gift certificate is used only online by entering a code provided to the receiver or could be printed for use in a bricks and mortar store. Cash equivalents such as Flooz™, formerly available from Flooz.com, could also be provided to the receiver 130. A retailer could offer to match donations to a charity by increasing the amount of a gift certificate for the charity that is sent by the initiator 110. The enhanced gift certificates would be provided by the gift certificate handler 160-1.

As briefly discussed above, the ATM interface 180-1 also allows interaction with the payment enabler 170. The user 110, 115, 130 may or may not have an affiliation with the ATM that is used to interface with the payment enabler 170. Under this circumstance, the owner of the ATM may charge the user a fee for this service. The user 110, 115, 130 can receive cash or deposit cash by inserting it into the ATM itself. Alternatively, the ATM interface 180-1 can be used to interface with the payment enabler 170 in the same way that a user 110, 115, 130 may interact through a web browser and computer 120 with the payment enabler 170. Any possible handler 160 could be configured to send or receive funds using the ATM interface 180-1. If the ATM has a magnetic stripe or smart card reader, this could be used by to avoid entering credit or debit card information manually for the payment enabler 170. The card for a particular handler 160 could be scanned by the reader to gather information for interfacing to the handler 160 without the user manually entering that information.

A kiosk interface 180-2 allows a user to interact with the payment enabler 170, but typically does not allow adding or removing cash. The kiosk interface 180-2 may be a browser terminal available for general use. Some embodiments may include a check or money order printer for removing money from the system 100. The kiosk interface 180-2 could be in a retail location 500 and linked to the other systems in the retail location 500 such that a payout could be provided by other systems in the retail location 500. Like the ATM interface 180-1, the kiosk interface 180-2 could have the ability to accept cash or checks along with the ability to read credit/debit cards for account information.

An Internet interface 180-3 is typically implemented through a web browser. The browser downloads web pages from the payment enabler 170. The Internet interface could be hosted by the computer 120 of the user 110, 115, 130. Some embodiments could host the Internet interface on a portable device such as a wireless phone or personal digital assistant (PDA). The Internet interface 180-3 may also be used by the ATM, kiosk and retail interfaces 180-1, 180-2, 180-4 in whole or in part. The Internet interface 180-3 uses encryption for the link to the payment enabler 170 in some embodiments. Instead of a web browser interface, application software could be used in some embodiments.

The retail interface 180-4 allows for specialized interaction by an agent or clerk at the retail location 500. Agents typically have special training and offer enhanced services in comparison to other interfaces 180 and handlers 160. The agent can move money between users 110, 115, 120 at the direction of the user. Also, the agent can payin and payout money from the transfer matching system 100. The retail interface 180-4 allows an agent to act on behalf of the user when manipulating the user's account on the system 100. For security, the user's password or PIN may be entered by the user 110, 115, 120 during this manipulation. Further, the agent may verify the identity of the receiver 130 before disbursing the electronic gift by checking identification or using biometric techniques. In one embodiment, a test question is provided by the initiator 110 that the receiver 130 must answer before the electronic gift is paid-out. In some embodiments, information from the user could be checked against public databases to authenticate the user, for example, confirming the maiden name of the mother of the user.

Interaction with the payment enabler 170 may also be performed over a telephone interface 180-5. The phone interface 180-5 provides voice prompts and recognizes the user's touch-tone or speech recognized input. Enhanced interaction with the phone interface 180-5 could be provided with wireless phones having wireless access protocol (WAP) and/or browser graphical user interfaces (GUIs).

Figure 3:
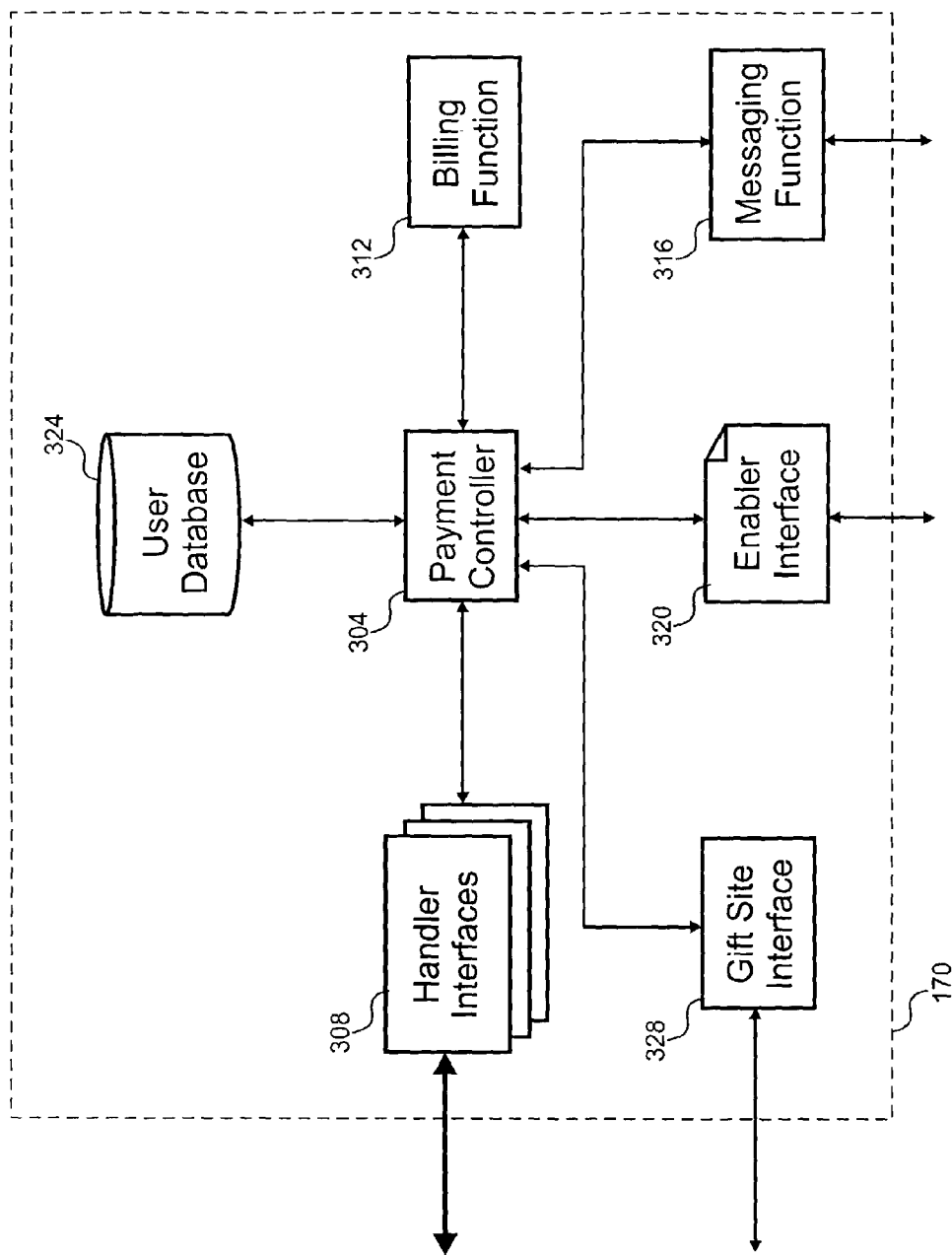
FIG. 3 is a block diagram of an embodiment of a payment enabler.

Referring to FIG. 3, a block diagram of an embodiment of a payment enabler 170 is shown. The transfer of money between handlers 160, stored value funds and users 110, 115, 130 is controlled by the payment enabler 170. The payment enabler 170 may be implemented on one or more computers in one or more locations where the various computers communicate over a network. Included in the payment enabler 170 are a payment controller 304, handler interfaces 308, a billing function 312, a messaging function 316, an enabler interface 320, a user database 324, and a gift site interface 328.

The payment controller 304 manages operation of the payment enabler 170. The handlers 160 and interfaces 180 along with managing payins, transfers, payouts, and account maintenance are all choreographed by the payment controller 304. Interaction between the gift site 140 and payment enabler 170 is also managed by the payment controller 304. The payment controller 304 is interconnected to the other portions of the payment enabler 170 by one or more networks.

A billing function 312 monitors and charges for the services of the payment enabler 170. There may be charges when transferring money, converting money to other currencies, sending matching funds, printing and mailing negotiable instruments, using kiosks, ATMs or retail locations, etc. These charges are normally deducted from a transfer, but other embodiments could charge the initiator 110 or charge a monthly fee, for example. Some embodiments could recover a fee from the handler 160. For example, a fee could be charged to the target store of the gift certificate. The different types of handlers 160 may have different fees associated with them. For example, a credit card may have a three percent charge, but a bank transfer may only have a one percent charge. The transfer in or out of the system 100 may incur a separate charge. Autosweep transfers out of the system 100 could also incur a separate charge. The billing function 312 may issue invoices for some users 110, 115, 130.

There are handler interfaces 308 to support the various handlers 160. Each of these interfaces 308 may support a single handler 160 or a group of handlers. For example, a single interface may perform EFT both to and from all bank handlers 160-4. When money is sent to or received from a handler 160, the appropriate handler interface 308 passes the money and transfer information to and from the payment controller 304. In some embodiments, the cost of the transfer to or from the handler 160 is reported by the handler interface 308 such that the billing function 312 can recover those costs.

Information for the users 110, 115, 130 of the system 100 is stored in the user database 324. This information includes an address book of other users, money credit in the stored value fund, past money transfer information, account number, e-mail addresses, contact information, handler interface information, handler preference information, etc. The stored value account is a money credit that is stored in a trust account for the benefit of the user according to the entry in the user database 324 corresponding to that user and interest may or may not be paid on that money credit.

The enabler interface 320 is used by the various interfaces 180 to interact with the user. The enabler interface 320 produces the form web pages and informational web pages to allow the user to create and maintain their account, transfer money, select electronic gifts, and learn to use the system 100. In some embodiments, the interaction pages are not web pages, but use some other interface protocol understood by both the enabler interface 320 and the user interface 180. The appropriate user interface 180 formats and processes the enabler interface information according to the device used to interface with the payment enabler 170. For example, the Internet user interface 180-3 takes the information from the enabler interface 320 and formats into hypertext mark-up language (HTML) appropriate for the computer 120 of the user 110, 115, 130. The interaction with the enabler interface 320 provides information such that the payment controller 304 can configure the payment enabler 170 for the user 110, 115, 130.

A messaging function 316 is used with some configurations to notify the user 110, 115, 130 of certain events. Requests for money are sent by the messaging function 316 along with acknowledgment and billing messages. These messages could be accessed using a web browser, an e-mail program, an instant messaging program, a pager, a WAP enabled device, etc. In some embodiments, the messaging function 316 may issue printed bills for users. The messaging function 316 is also used to communicate with retail locations and the gift site 140.

Figure 4:
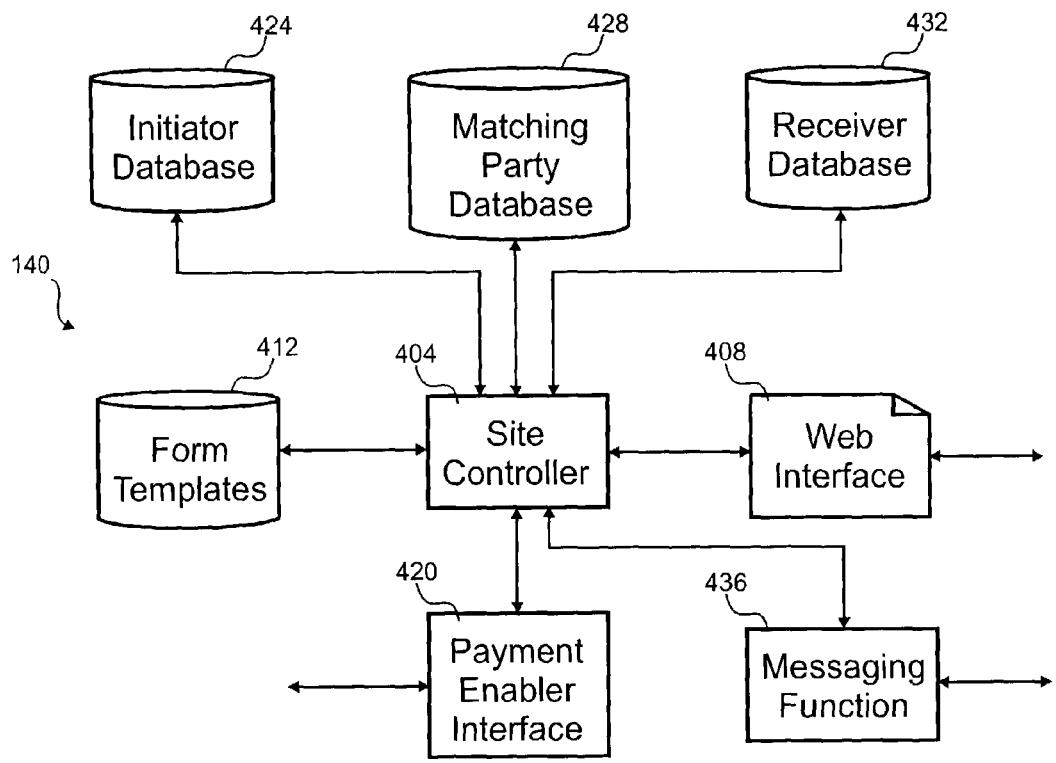
FIG. 4 is a block diagram of an embodiment of a gift site.

With reference to FIG. 4, a block diagram of an embodiment of a gift site 140 is shown. The gift site 140 works in concert with the money transfer system 190 where the gift site 140 is the primary interface 140 for configuring the matched transfer and the money transfer system 190 performs the transfer of funds. In various embodiments, the receiving party 130, the matching party 115 and/or the electronic money transfer system 190 may own and maintain the gift site 140. Customizations in branding could be done for each of those parties so the initiator believes they are dealing with a particular entity, such as a charity, utility company, doctor, or organization. Some embodiments could have multiple gift sites 140 that are linked to share information on users 110, 115, 130. For example, a company may brand a gift site 140 for use by the employees which could have a number of charities and a trade union could brand a gift site 140 that shares the same list of charities and matching information for the company. In this embodiment, the gift site 140 includes a site controller 404, a web interface 408, a form template database 412, a initiator database 424, a matching party database 428, a receiver database 432, a messaging function 436, and a payment enabler interface 420.

The site controller 404 manages the functions of the gift site 140. The web interface 408 and messaging function 436 allows interaction with the gift site 140. Pages are formulated by the site controller 404 using information from the various databases 412, 424, 428, 432. For the transfer of money, the site controller 404 uses the payment enabler interface to interact with the gift site interface 328 of the payment enabler 170. The site controller 404 customizes the interface 408 for the type of user so the initiator 110, matching party 115, and receiver 130 interact with pages unique to their circumstance.

The web interface 408 and messaging function 436 are the interface to the user 110, 115, 130 and the payment enabler interface 420 communicates with the payment enabler 170. These interfaces 408, 420, 436 use a wide area network such as the Internet to communicate. The web interface 408 provides the screens for the user to interact with. Where a message is sent, the messing function 436 is used. For example, where a matching party 115 does not approve matching a transfer, the initiator 110 can be notified with an e-mail message. During any matched transfer, communication between the payment enabler 170 and gift site 140 can pass through the payment enabler interface 420 and could be encrypted or otherwise protected. Login authentication, account information, and other status information can pass through the payment enabler interface 420.

When the user 110, 115, 130 performs the money transfer aspects of this invention, the web interface 408 hands them off to the enabler interface 320 of the transfer system 190 in this embodiment. This could be done by opening a new interface window on the computer 120 or embedding the enabler interface 320 into the web interface 408 of the gift site. The enabler interface 420 facilitates the communication between the gift site 140 and the transfer system 190 such that the user 110, 115, 130 is provided with a seamless experience. For example, the branding of the gift site 140 could be maintained in pages of the payment enabler 170 even though the payment enabler 170 may also use their own branding in those pages. The payment enabler may require another login by the user 110, 115, 130 or could rely upon the login performed on the gift site 140. In some embodiments, the login for both the gift site 140 and the payment enabler 170 could be unified such that either party relied upon the other for login authentication.

Databases 412, 424, 428, 432 in the gift site 140 store information used by the site controller 404. These databases are 412, 424, 428, 432 stored in the gift site 140, but other embodiments could store some or all of this information in the payment enabler 170. The form template database 412 has various matching forms and tax receipts provided during the matching process. Matching forms are available for initiators 110 to submit to matching parties 115 who are not using the system 100 and for matching parties who may want paper records of the donations submitted for matching. In various tax jurisdictions, the various parties may want receipts of their transfer. For example, the initiator 110 or matching party 115 may want a tax receipt to show to a payment to a charity. Some embodiments, could automatically report the relevant tax information to the tax authority if the user 110, 115, 130 authorized this. Other embodiments could combine the matching form with some tax receipts onto a common form.

Contained in the form templates are fields that are populated with information available to the gift site 140. The matching forms may have branding for the matching party 115 or receiver 130 and fields for the amount given by the initiator 110, the date of the gift, the address of the parties 110, 115, 130, and whether the gift and match qualifies for favorable tax status, etc. The tax receipts indicate the party 110, 115 making the gift, the amount, the date, the address of the parties 110, 115, 130 to the gift, tax qualifications of the receiver, etc.

Information on the users 110, 115, 130 is maintained in separate databases 424, 428, 432 for the different types of users 110, 115, 130. The initiator database 424 stores login information, preferences on giving, sort criteria for charities, matching party affiliations, forms desired, demographic information, payment enabler account information 170, etc. In the matching party database 428, information such as matching criteria, type of matching (e.g., automatic or manual), matching and tax forms to use, demographic information, an explanation of the matching criteria, payment enabler account information 170, etc. The receiver database 432 includes receiver information relating to the efficiency of the charity, the goals of the charity, branding information on the charity, donation criteria, promotional gift terms for certain donations, payment enabler account information 170, tax forms and accounting preferences, qualification status for tax benefits, etc. For example, whether the charity qualifies in the United States as a charity such that a donor could deduct or expense the gift is stored in the receiver database 432. The information on the charity may be provided by the charity or independently found through research. With privacy safeguards, the information in the databases 424, 428, 432 could be shared with other gift sites 140 or electronic money transfer systems 190.

Figure 5:
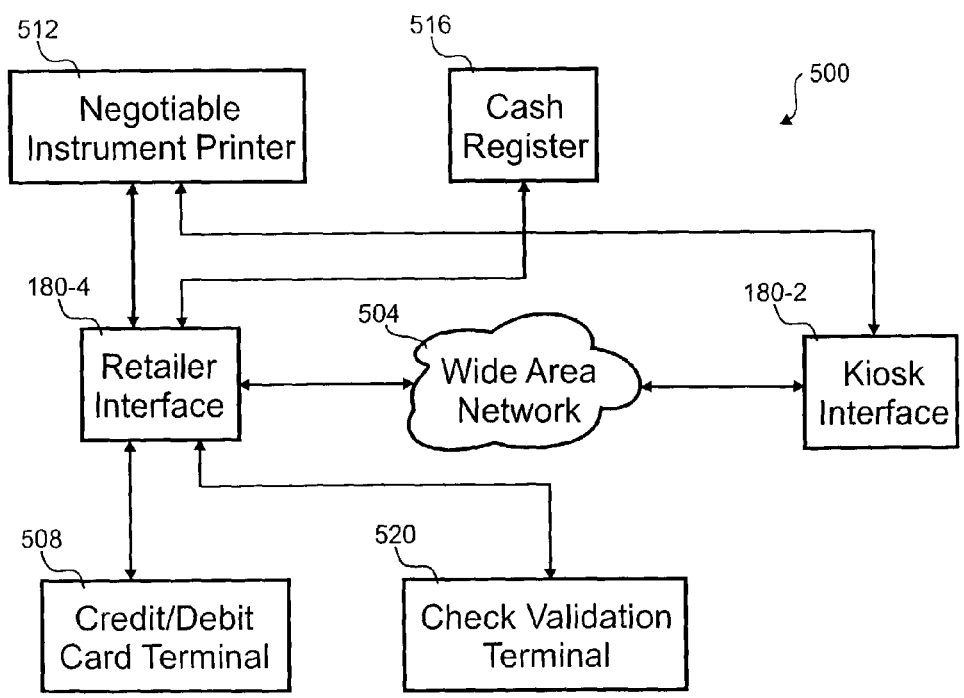
FIG. 5 is a block diagram of an embodiment of a retail location.

A Referring to FIG. 5, a block diagram of an embodiment of a retail location 500 is shown. The retail location 500 is a physical store that makes the system 100 available to those who may want a human interface to a matching transfer service. Included in the retail location is an agent interface 180-4, a kiosk interface 180-2, a cash register 516, a negotiable instrument printer 512, a credit/debit card terminal 508, a check validation terminal 520, and a wide area network 504. Both the retail and kiosk interfaces 180-2, 180-4 are coupled to the payment enabler 170 by way of the wide area network 504. The retail location 500 may be used as a retail money handler 160-5 to accept and disperse money in the form of check, money order, cash, gift certificate, account transfer, etc.

The kiosk interface 180-2 is primarily intended for users to interact with, and the retail interface 180-4 is primarily intended for agents to interact with. In some embodiments, both interfaces 180-2, 180-4 are used to perform a transfer. For example, the agent may use the retail interface 180-4 to perform the transfer while the kiosk interface 180-2 is used to monitor the agent's actions and enter a password or PIN that is kept secret from the agent. The kiosk interface 180-2 may also be used to perform a complete transfer in circumstances where the user 110, 130 is trained to use the system 100, but does not utilize other interfaces 180 for whatever reason.

The retail interface 180-4 and kiosk interface 180-2 can output a negotiable instrument, tax receipt and/or matching form with a printer 512. Examples of negotiable instruments include money orders, cashiers checks, tellers checks, certified checks, checks, gift certificates, coupons, etc. In some embodiments, each interface 180-2, 180-4 may have a separate printer. The printer 512 may also be used to print receipts and messages related to the transfer of money.

Money can be added to or removed from the system 100 at the retail location 500 with money distribution devices 508, 516, 520. In the conventional manner, cash can be received by the cash register, credit or debit cards and be debited by the card terminal 508, and checks can be confirmed with a check validation terminal 520. Cash can be paid out from the cash register 516 or added to a credit or debit card by the card terminal 508 in a conventional fashion. These money distribution devices 508, 516, 520 all interface with the system 100 by way of the retail interface 180-4 such that payouts and payins can be automatically recorded by the payment enabler 170.

Figure 6A:
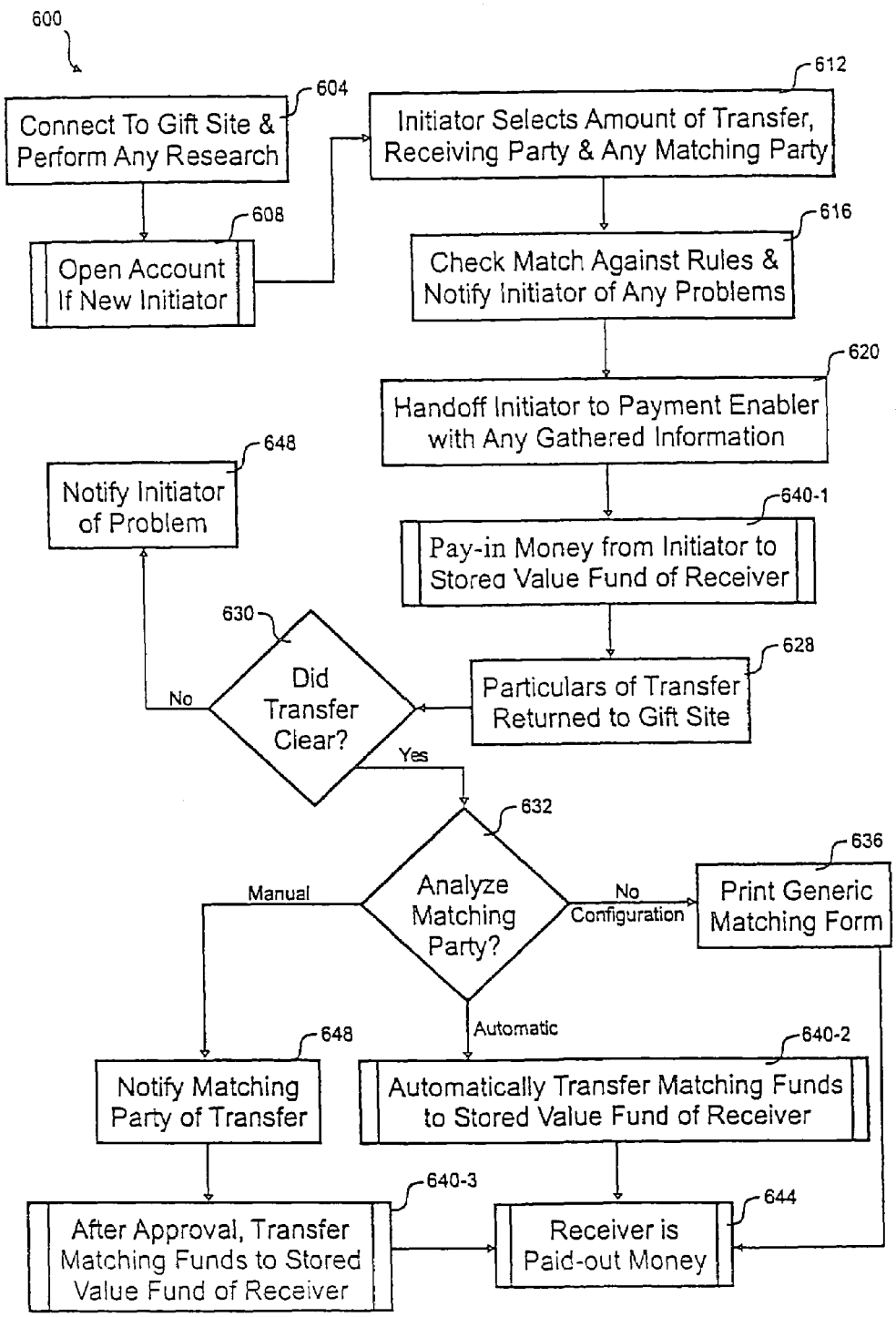
FIG. 6A is a flow diagram of an embodiment of a process for sending a gift that is matched.

With reference to FIG. 6A, a flow diagram of an embodiment of a process 600 is shown for sending a matched gift. In this embodiment, the initiator 110 sends a gift to a receiver 130 that is automatically enhanced by the matching party 115. The depicted portion of the process begins in step 604 where the initiator connects to the gift site 140 with a computer 120 using an Internet interface 180, for example. Research is conducted into matching and receiving parties 115, 130. If the initiator 110 is new, an account is created for both the gift site 140 and the payment enabler 170 in step 608. In step 612, the initiator 110 indicates the amount of the transfer, the receiving party 130 and any matching party 115. Sometimes, there is no matching party 115 available such that the transfer is not enhanced by the system 100, but could be later when a paper form is provided to the matching party 115.

As part of homeland security or other measures, transaction information can be checked against a government-supplied hot list of information in some embodiments. This could include checking any of information provided by the initiator 110 against lists or rules provided by the government. In one embodiment, the Office of Foreign Assets Control (OFAC) provides the government hot list, but any number or combination of government hot lists could be checked. Where information matches the hot list, this information can be investigated. The investigation could be performed by the payment enabler staff and/or government agents. If the match to the government hot list is determined to be a false positiveafter proper investigation, processing would continue normally.

The matching party 115 provides rules and guidelines for an acceptable transfer that qualifies for matching. In step 616, the gift site 140 checks the amount of the transfer to confirm that it qualifies. Any errors can be noted such that the initiator 110 can revise the transfer accordingly. Once the terms of the transfer are acceptable, the initiator 110 is handed-off from the web interface 408 of the gift site 140 to enabler interface 320 of the payment enabler 170. Any configuration information useful to the payment enabler 170 can be passed by the payment enabler interface 420.

The initiator 110 interacts with the payment enabler 170 to fund the transfer in step 640-1. Information relating to the transfer are returned from the payment enabler 170 to the gift site in step 628. For example, whether the transfer cleared successfully is relayed to the gift site 140. If the payment later clears or is denied, that status is also related to the gift site 140. Some embodiments wait in step 628 until the transfer clears completely. Where the transfer does not clear as determined in step 630, processing continues to step 648 where the initiator 110 is notified of that status through the web interface 408 and/or messaging function 436.

Where the transfer does clear, as determined in step 630, processing continues to step 632 where the type of matching party is analyzed. Where the matching party is not configured in the system, a generic matching form is printed in step 636 before the receiver 130 is paid-out in step 644. The initiator 110 may be given a choice of possible generic forms to pick the one that best matches the form of their organization.

Where it is determined in step 632 that the matching party 115 is configured with the system, further processing depends on whether automatic or manual matching was selected by that matching party 115. Where automatic matching is enabled for this matching party 115, processing continues to step 640-2 where matching funds are transferred to the stored value fund of the receiver. Some embodiments could further check the matching request to confirm it qualifies. If for some reason, the matching transfer does not clear, the initiator 110 and matching party 115 could be so notified such that any problem could be corrected.

Where manually confirmed matching is configured for the matching party 115, a notification is sent in step 648 to the matching party 115. The matching party could then approve the transfer. Presuming the matching party 115 approves the transfer, matching funds are transferred in step 640-3. If the matching party 115 does not approve the match, the initiator can be so notified with the messaging function 436. Once the funds are transferred, the receiver is paid-out in step 644. Some embodiments may allow the initiator 110 to retract their transfer if the matching transfer fails to clear or is denied.

Figure 6B:
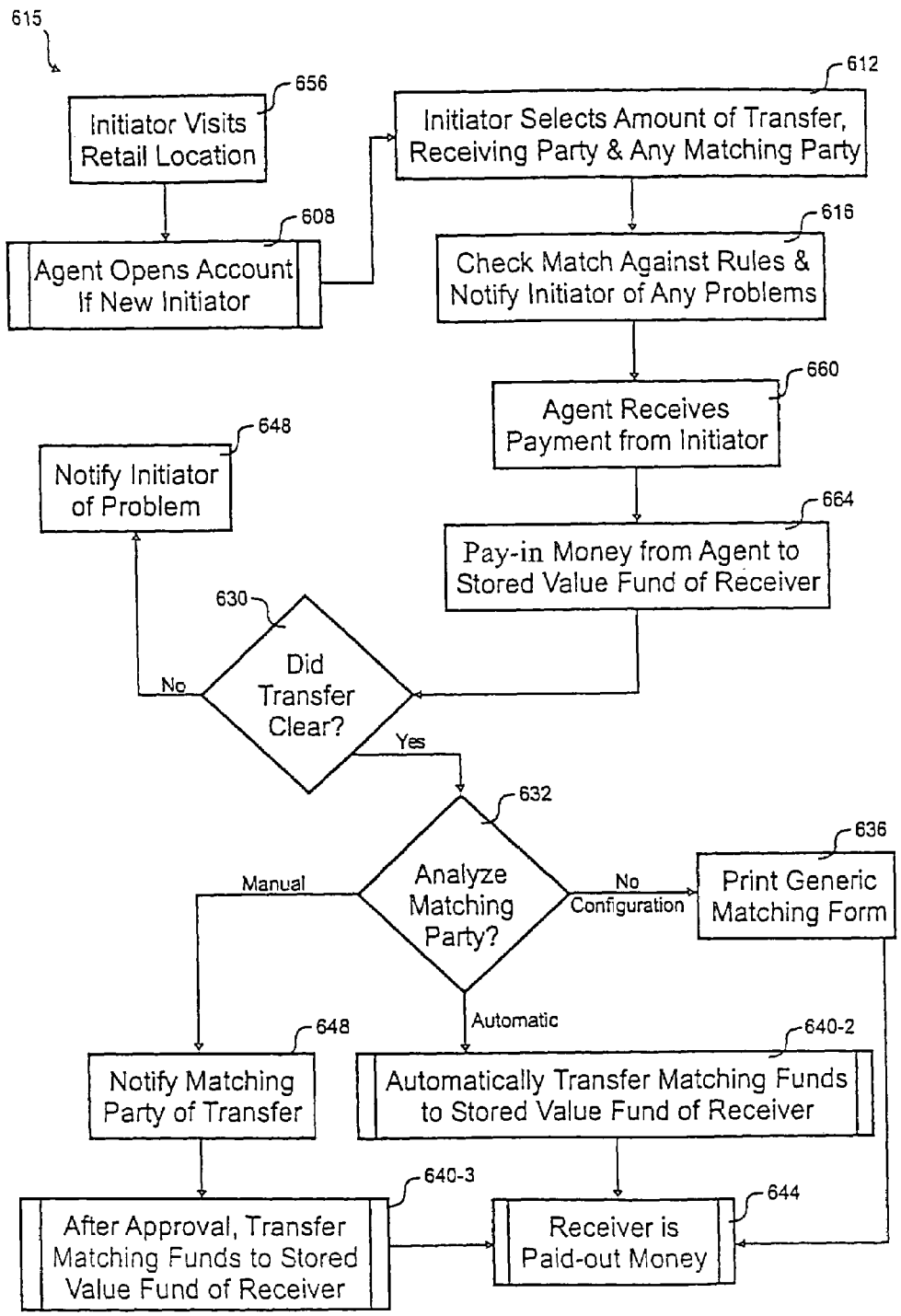
FIG. 6B is a flow diagram of yet another embodiment of a process for sending a gift where the initiator pays for the gift at a retail location.

With reference to FIG. 6B, a flow diagram of yet another embodiment of a process 615 for sending a gift is shown where the initiator pays for the transfer at a retail location 500. This embodiment allows the initiator 110 to use the system 100 by interacting with an agent or clerk by visiting a retail location 500 in step 656. An account is opened for new initiators 110 in step 608, but some embodiments could skip the account creation process. The transfer is specified and checked in steps 612 and 616. The agent receives payment from the initiator in the form of cash, credit and/or check. A corresponding transfer is performed with the payment enabler 170 by the agent. The remainder of the transaction proceeds in the manner specified in FIG. 6A with the agent serving as a proxy between the initiator 110 and the system 100.

Figure 7:
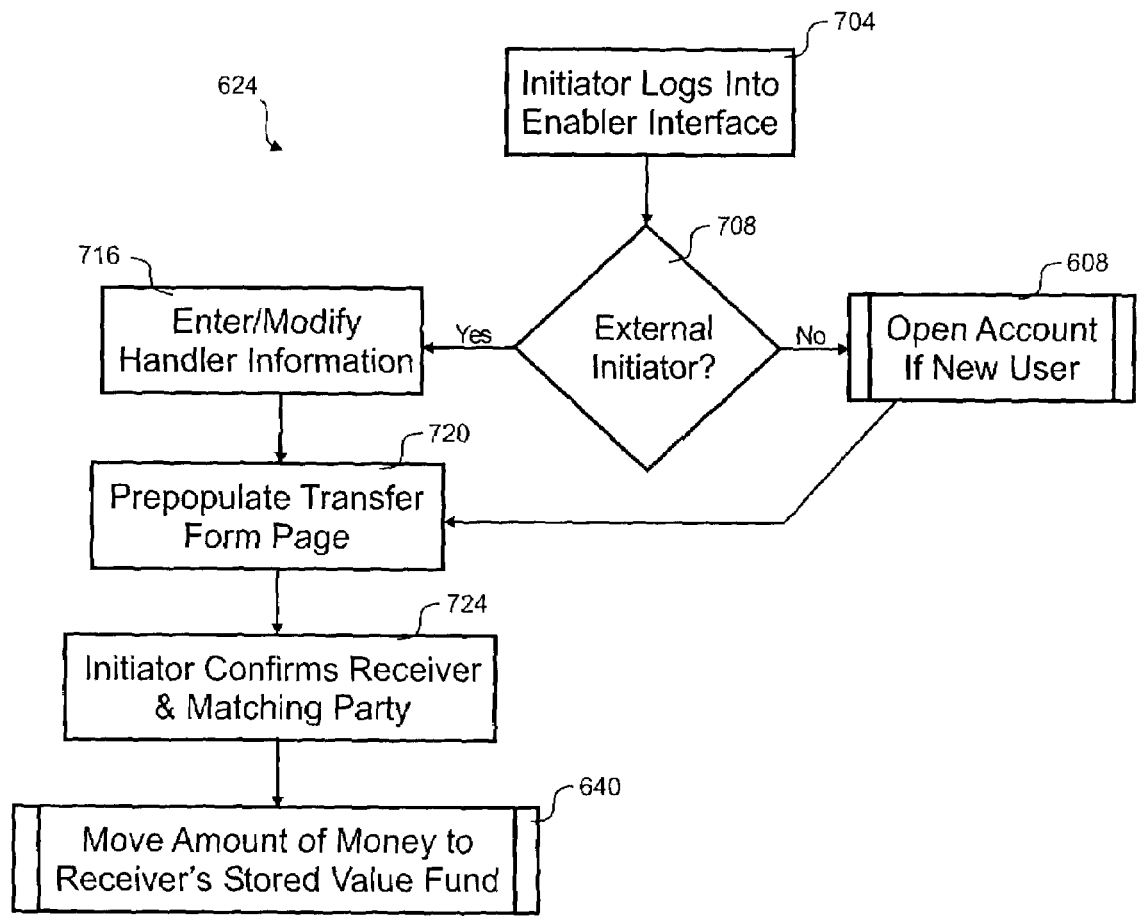
FIG. 7 is a flow diagram of an embodiment of a process for an initiator to payin money for the payment enabler.

Referring to FIG. 7, a flow diagram of an embodiment of a process 624 for an initiator 105 to payin money for the payment enabler 170 is shown. To fund the transaction, money is transferred from a money handler 160 of the initiator 110 to a stored value fund of the receiver 130. To store the current transfer, the stored value fund may be used only once or could be used any number of times by the receiver 130. The stored value fund can be identified by the e-mail address of the receiver 130, or some other unique code. If a fund already exists for the receiver 130 in the payment enabler 170, it may be used for the present transaction.

The depicted portion of the process starts in step 704 where the initiator 110 logs into the enabler interface 320 after being handed-off from the gift site 140. In some embodiments, the initiator 110 may be automatically logged in based upon information from the gift site 140 or a separate login could be required. Depending on the situation, the initiator may or may not need to open an account with the payment enabler 170. Where the initiator 110 doesn't need an account for the funds transfer, the initiator is said to remain "external" to the transfer system 190. If an account is required as determined in step 708, an account is opened in step 712 if there is none. For external transactions, money handler information is provided in step 716.

An identifier is entered for the receiver in step 720, although this step could be automatically performed with information from the gift site 140. The identifier in this embodiment is the e-mail address of the receiver 130, but different identifiers could also be used in other embodiments. In step 724, the initiator 110 confirms the specifics of the transfer. The prices may include any service fees that are either paid over and above the transfer amount or deducted from the transfer amount. The money is moved from the specified money handler 160 to the stored value fund of the receiver in step 640.

Figure 8:
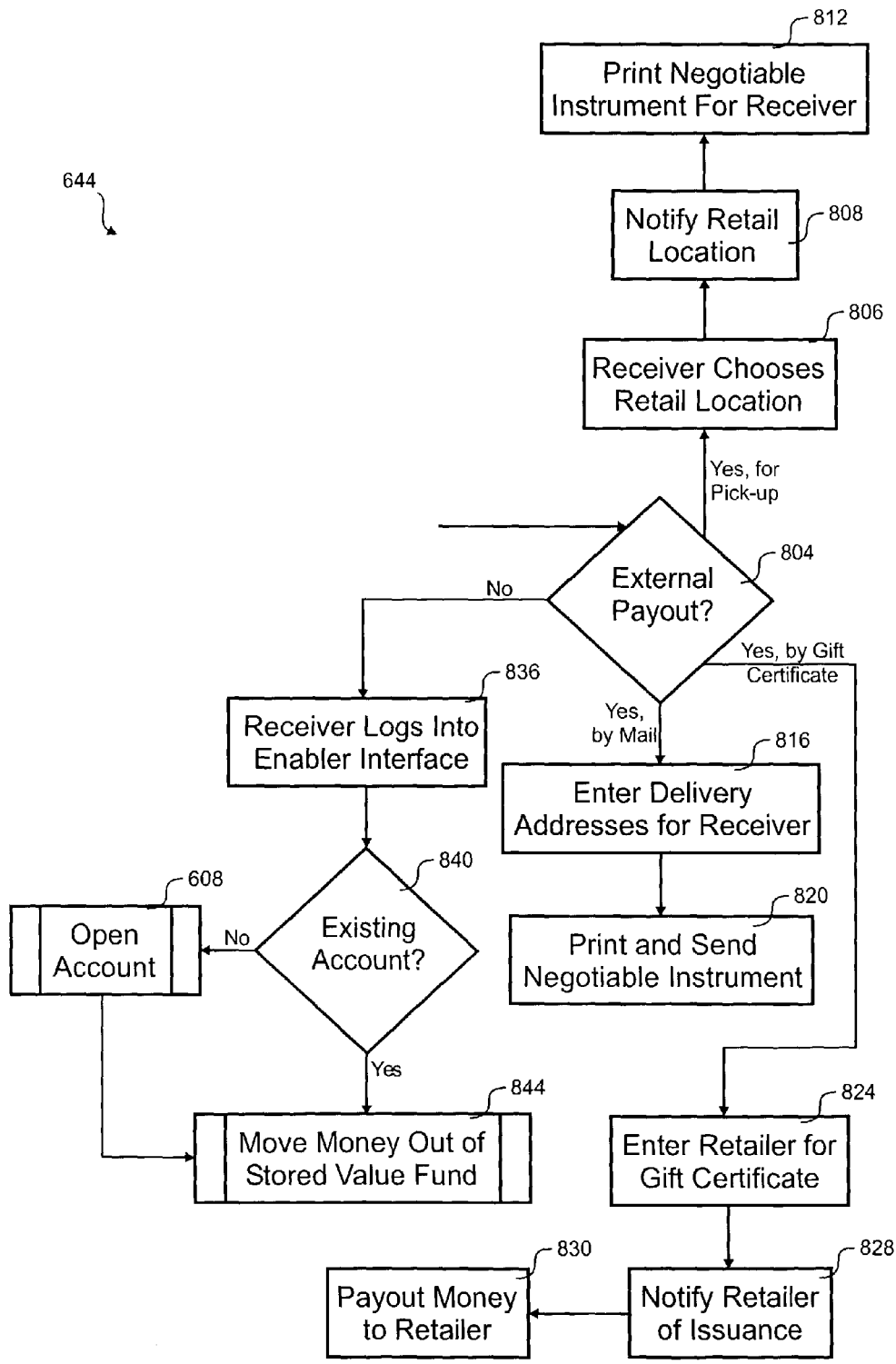
FIG. 8 is a flow diagram of an embodiment of a process for paying-out the gift from the payment enabler to the receiver.

With reference to FIG. 8, a flow diagram of an embodiment of a process 644 for paying-out the funds from the payment enabler 170 to the receiver 115 is shown. The funds could include both the initiator's transfer and the matching parties transfer or just the initiator's transfer. This embodiment demonstrates four different payout examples that are branches off step 804: payment of money to the stored value fund of the receiver 130, printing of a negotiable instrument for pick-up at a retail location 500, printing and delivery of a negotiable instrument to a specified address, and delivery of a gift certificate with a targeted retailer. The first option allows the receiver 130 to choose the money handler 160, while the latter three options are called external payouts where the money handler 160 is specified by the initiator 110. For example, the initiator may specify a gift certificate where the money is limited to merchandise or services from specified retailer(s).

In any event, the depicted portion of the process 636 begins in step 804 where the types of external payouts are separated from the internal payout option. Step 806 is the start of the external payout option where a negotiable instrument is provided to a retail location 500 for a receiver 130. After clicking on the button or icon by the receiver 130 to receive a payout as a negotiable instrument, a screen is presented with information negotiable instrument in this case. Accounting information is provided to indicate which parties 110, 115 contributed to the current payout. That screen or a subsequent screen allows the receiver to find a retail location 500 that is conveniently located for pick-up of the negotiable instrument. In step 808, that retail location 500 is notified of the negotiable instrument and particulars on the receiver 130. These particulars may include a way to validate the identity of the receiver 130. For example, a test question and answer could be used to verify identity. In step 812, the negotiable instrument is printed for the receiver 130 after any verification of identity.

The next external payout option involves mailing out a printed negotiable instrument to the receiver 130. In step 816, the initiator 110 enters the delivery address for the receiver 130. The payment enabler 170 chooses the money handler 160 to use to print the negotiable instrument where there is more than one hander available 160. That money handler 160 prints and sends the negotiable instrument in step 820. The postal service, a package delivery service, courier or other method could be used to deliver the negotiable instrument. In some cases, a bank and account could be specified such that the negotiable instrument can be added to the account of the receiver 130 by the bank upon receipt.

In the final external payout option depicted, a gift certificate or store credit is forwarded to the target retailer(s) for the benefit of the receiver 130. In some embodiments, the gift certificate could be redeemable at a number of retailers, such that one of those would only get credit if the receiver 130 spent the gift certificate at one of the number of retailers. In step 824, the initiator 110 enters the target retailer or group of retailers into the payment enabler 170. The retailer or group is notified of the issuance of the gift certificate in step 828. In step 830, the credit is paid out to the retailer.

With an internal payout, the receiver 130 is given the equivalent of cash that can be used in a number of ways that are directed by the receiver 130. The messaging function 316 notifies the receiver 130 of payments to their stored value fund to invite the receiver 130 to log into the payment enabler interface 420 in step 836. As indicated in step 840, the receiver 130 can log into an existing account or open a new account in step 712. In some cases, an initiator 110 and matching party 115 send money to a receiver 130 who is not yet configured with the payment enabler 170 such that an account is opened for the receiver 130 to remove the funds as an internal payout. Once an account is logged into or created, the receiver moves the money out of their stored value fund in step 844.

Figure 9:
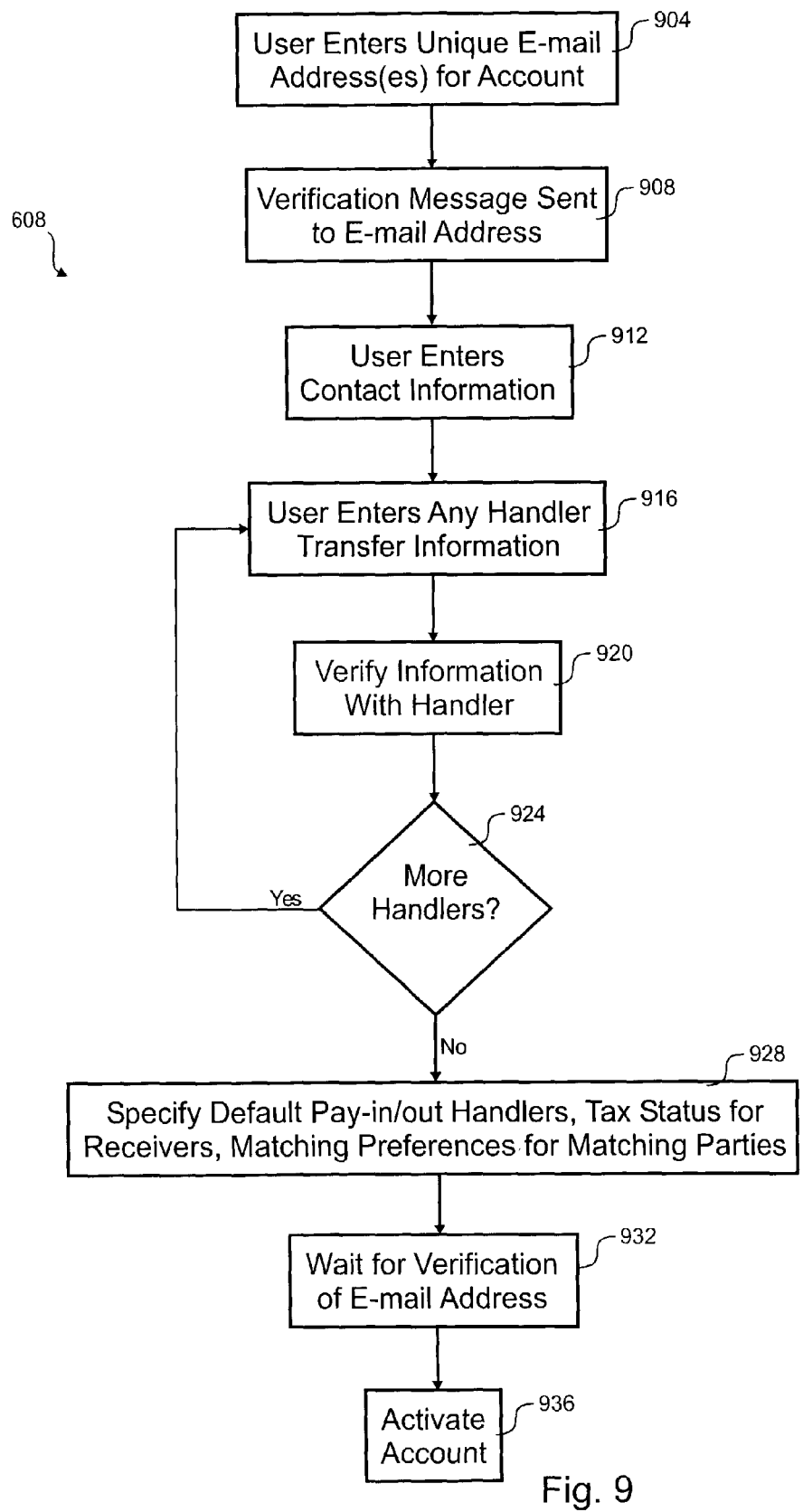
FIG. 9 is a flow diagram of an embodiment of a process for configuring a user with an account for the electronic money transfer system.

Referring to FIG. 9, a flow diagram of an embodiment of a process 608 for configuring a user 110, 115, 130 with an account for the electronic money transfer system 190 is shown. Where the receiver 130 or initiator 110 is not external to the system, an account with the payment enabler 170 is created. The depicted portion of the process 712 begins in step 904 where the user 110, 115, 130 enters an e-mail address as the unique identifier for the account. The user 110, 130 may want to enter any other e-mail addresses that are aliases of the user and that may be used by counter parties to a transaction. Other embodiments could use any unique identifier for the user 110, 115, 130.

Once an e-mail address is given to the payment enabler 170, it is verified. A message is sent to the e-mail address in step 908. A code is provided and an URL such that the user can click on the URL to load a page where the code is entered to verify the email address. In this embodiment, the code is a randomly generated set of alphanumeric characters. Other embodiments could use any number of methods to verify the e-mail address.

The user 110, 115, 130 enters contact information in step 912. This contact information could include address, phone number, pager address, instant message address, wireless phone address, contact e-mail address, etc. In step 916, the user enters handler interface information. For example, the user might enter credit card information and bank transfer information. In step 920, the information is verified with the handler 160 to the extent possible for that handler 160. In step 924, the process 608 can loop back to step 916 for entering and verifying additional handlers 160.

In step 928, a default input handler 160 and a default output handler 160 can be chosen for transferring money into and out of the system 100. These two handlers 160 may be different or the same. Also, information for the initiator, matching party and receiver database 424, 428, 432 is specified. This information could be specified to the payment enabler 170 and passed to the gift site 140 or the user 110, 115, 130 could be handed off to the gift site 140 for entry of this information. In step 932, the payment enabler 170 waits for verification at least one of the e-mail addresses before activating the account for sending and receiving money with that e-mail address in step 936.

Figure 10:
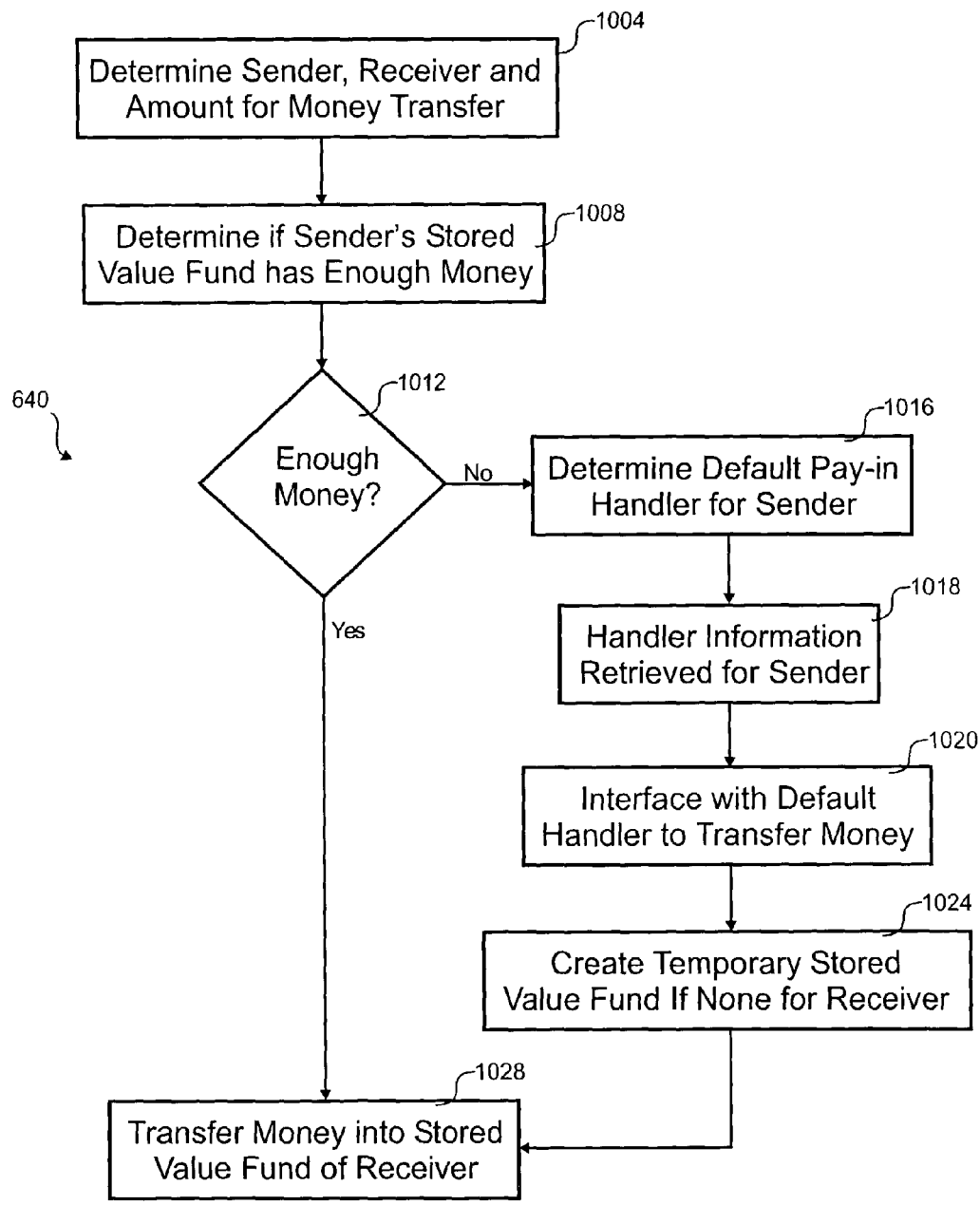
FIG. 10 is a flow diagram of an embodiment of a process for transferring money from the initiator to the receiver.

With reference to FIG. 10, a flow diagram of an embodiment of a process 640 for transferring money from the sender 110, 115 to the receiver 115 is shown. The sender could be either an initiating party 110 or a matching party 115. The process 640 describes a transfer between a single sender 110, 115 and a single receiver 130, but a number of these processes 640 could be performed in parallel where there are a number of receivers 130. For example, a corporation 110 could distribute gift certificates to a class of employees or clients with the retailer 115 enhancing the amount of the gift certificate. The depicted portion of the process begins in step 1004 where the receiver 130, sender 110, 115 and amount for the money transfer are determined. In steps 1008 and 1012, it is determined if the stored value fund of the sender 110, 115 has enough money to fund the transfer to the receiver 130.

Where there is not sufficient funds in the stored value fund, processing continues to step 1016 to load funds. In step 1016, the default payin handler 160 is determined, but the default can be overridden by the sender 110, 115. The information used to transfer money from the handler 160 into the payment enabler 170 is retrieved from the user database 324 in step 1018. The sender 110, 115 may be given an opportunity to change the default payin handler 160 for this transaction or for all further transactions. Presuming there are no changes, the default handler 160 is interfaced in step 1020 to transfer the money. If there is no stored value fund for the receiver 130, a temporary fund is created in step 1024. A temporary stored value fund can be used for a single transfer, but the receiver may want to make the temporary fund permanent by opening an account with the payment enabler 170.

Regardless of whether new money is added or whether existing money is used, processing continues to step 1028 from both steps 1012 and 1024. In step 1028, the money is attributed to the stored value fund of the receiver 130 to the detriment of the stored value fund of the sender 110, 115. In some embodiments, the payment does not originate in the sender's stored value fund, but passes directly from the money handler 160 of the sender 110, 115 to the stored value fund of the receiver 130. In other embodiments, the sender 110, 115 can select a future time that payment is made such that the payment is configured now, but completed at the future time.

Figure 11A:
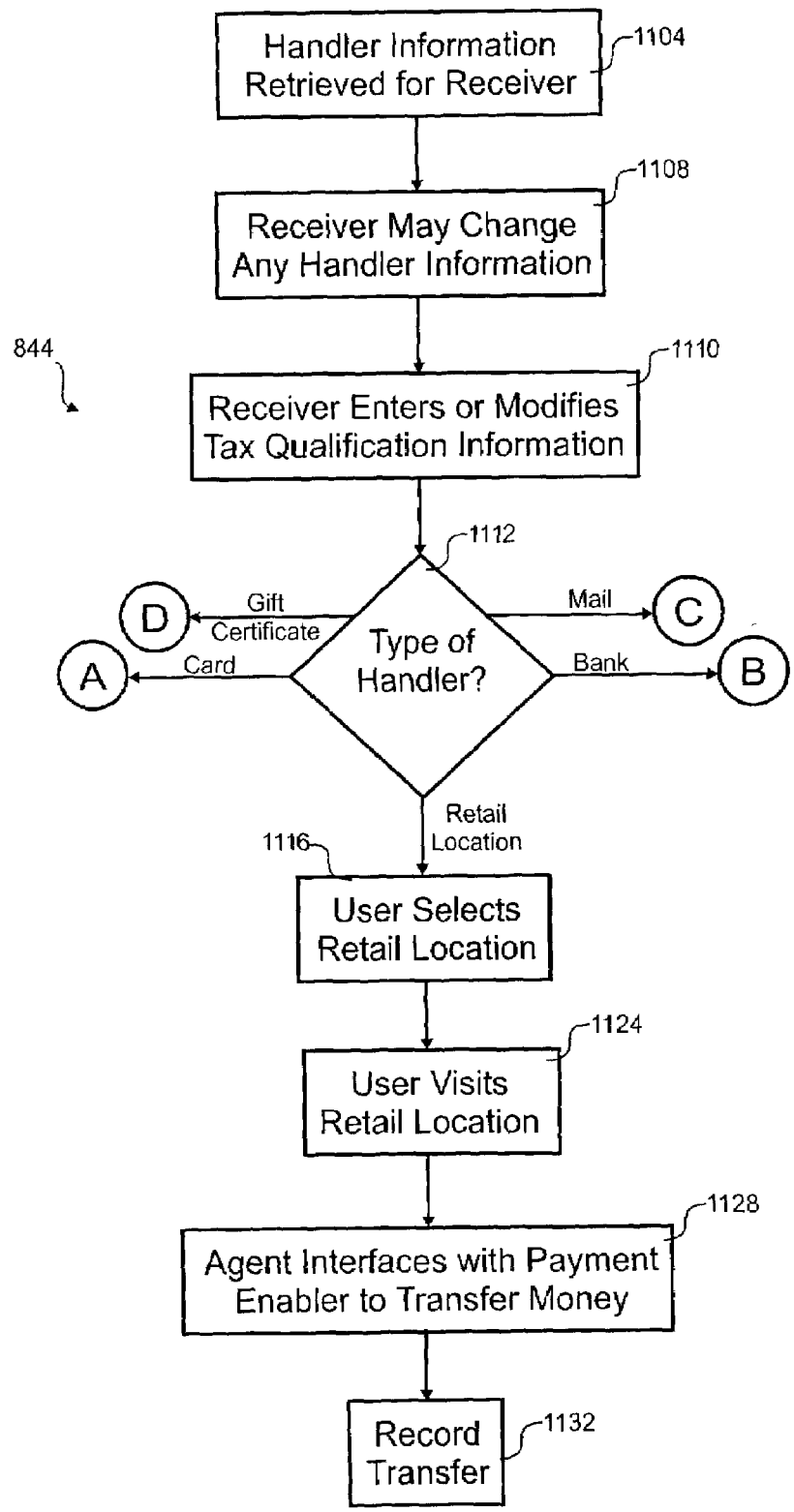
FIGS. 11A and 11B are a flow diagram of an embodiment of a process for moving money out of a stored value fund for a receiver.
Figure 11B:
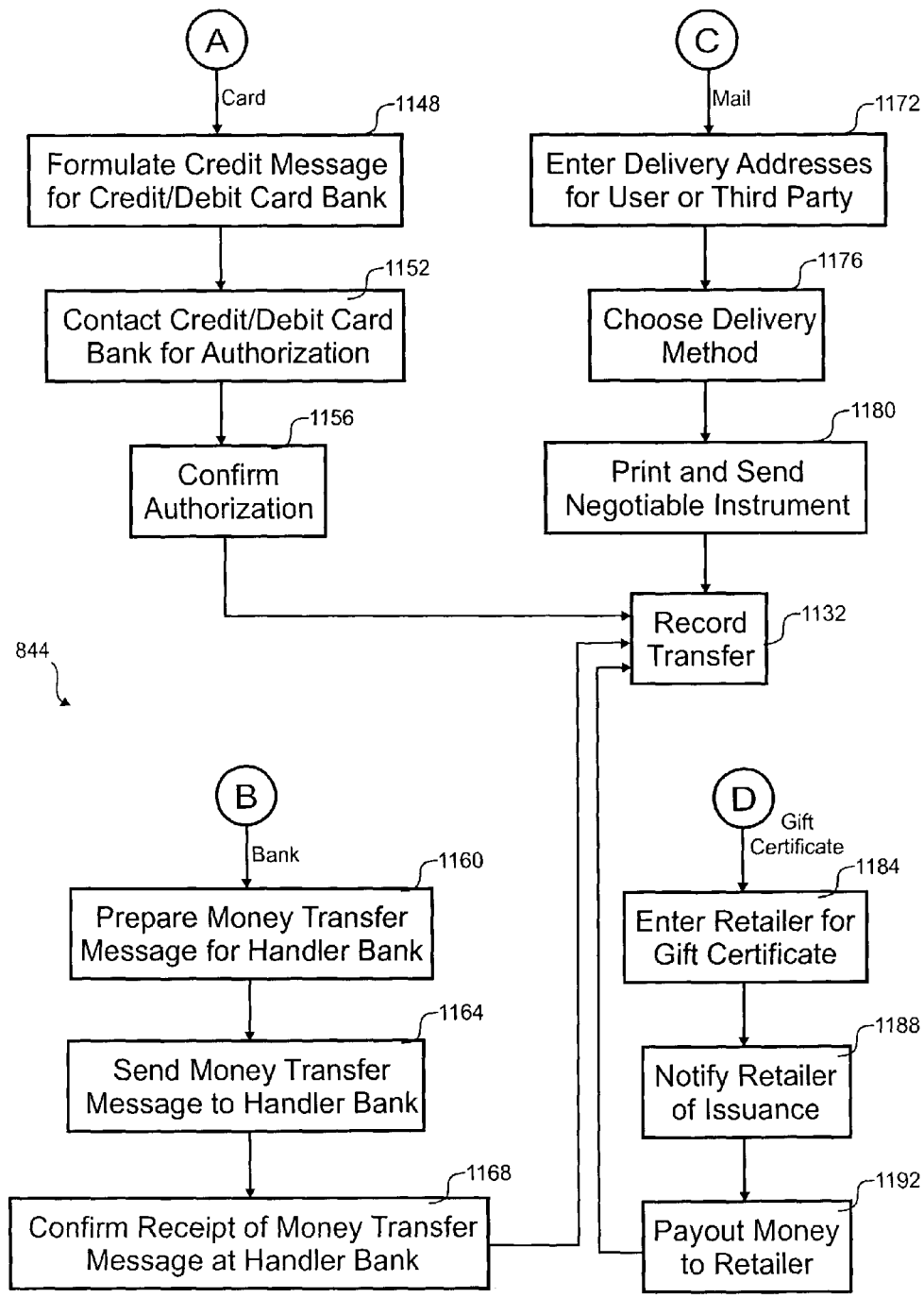

Referring to FIGS. 11A and 11B, a flow diagram of an embodiment of a process 844 for moving money out of a stored value fund for a receiver 130 is shown. This embodiment allows paying-out money in at least five different ways, namely, by: pick-up at a retail location 500, a credit to a debit or credit card, a credit to a bank account, mailing a negotiable instrument, and sending an electronic gift certificate. The depicted portion of the process 844 begins in step 1104 where the default payout handler information is retrieved for the receiver 130. In step 1108, a web page is presented that allows the receiver 130 to select a different handler 160 or to change information for the handler 160. In step 1110, the receiver 130 is given a chance to modify information in the receiver database 432.

In some embodiments, a receiver 130 may have a number of different currencies of money in their stored value fund. The user may select some or all of the different currencies for paying out. In many cases, the handler 160 only accepts money in a single currency or the user may simply wish to exchange money to another currency an exchange rate database in the payment enabler 170, for example, can be queried for the current rate that is applied in the conversion.

In step 1112, processing branches in one of five directions depending on the type of handler 160 the receiver 130 has chosen. The first direction is depicted on FIG. 11A and the remainder are depicted on FIG. 11B. One branch beginning in step 1116 corresponds to the user visiting a retail location 500 to transfer out money with the assistance of the agent. In step 1116, the user selects a retail location 500 that is convenient. The user visits the retail location 500 in step 1124 to either use a kiosk interface 180-2 or use the agent. In this embodiment, the user interfaces with the agent who uses the retail interface 180-4 to the payment enabler 170. From the retail interface 180-4, the agent can transfer the money to any handler 160, can print a negotiable instrument or can provide cash to the user. The transfer is recorded by the payment enabler 170 in step 1132.

Although not shown, a promotion program could be chosen as a handler 160. One promotion program would be purchase of airline miles, for example. Either the promotion handler 160 or an exchange rate database can be queried to determine the exchange rate for program credits or points. The conversion rate could be presented to the user for approval. Presuming the rate is approved, the promotion credits or points are purchased by interfacing with the promotion handler 160.

In yet another branch that begins in step 1148 of FIG. 11B and is labled "A," a credit card or debit card is used to transfer out money from the system 100. In step 1148, a credit message is formulated for the card bank. In some embodiments, the identity of the card holder may be further verified by entry of a PIN or other verification method. The card bank is contacted in step 1152 for authorization of the credit. Authorization of the credit is performed in step 1156. The payout is recorded with the payment enabler 170 in step 1132.

In the branch labeled "B," a bank transfer is used to payout money from the system 100. In step 1160, an EFT message is formulated for the handler bank 160-4. The EFT message is sent to the handler bank 160-4 in step 1164. Receipt of the EFT message is confirmed by the handler interface 308 in step 1168 and the transfer is recorded in step 1132.

In the branch of FIG. 11B labeled "C," a negotiable instrument is printed and sent to the receiver 130 or some other party designated by the receiver. In step 1172, the receiver 130 enters the delivery address and a name to pay the negotiable instrument to. The receiver 130 can send the negotiable instrument to himself/herself or a third party. A delivery method for sending the negotiable instrument is chosen in step 1176. In step 1180, the negotiable instrument is printed or otherwise produced and sent. The payout is recorded in the user database in step 1132.

In the last branch of FIG. 11B labeled "D," a gift certificate is used to payout the credit in the receivers stored value fund. In step 1184, a retailer(s) is chosen as a target for the gift certificate. The retailer is notified in step 1188. In step 1192, the money is paid-out to the retailer such that a store credit exists for the benefit of the receiver 130 or some other party chosen by the receiver 130.

A number of variations and modifications of the invention can also be used. For example, the matching party can be an individual such as a parent or donor. The parent could make available matching funds for a purchase by a child. For example, the parent may configure the matching system to provide one dollar for every two dollars of the child that are saved. A donor may make funds available to encourage other giving or other activity by another party. For example, the donor may impound a $100,000 donation in a fund raising drive until other donors meet some criteria such as raising $10,000 in a given time period.

While the principles of the invention have been described above in connection with specific apparatuses and methods, it is to be clearly understood that this description is made only by way of example and not as limitation on the scope of the invention.

What is claimed is:

1. A method for electronically transferring an amount of money from a first party to a third party where the amount is enhanced by a second party, the method comprising steps of:
   receiving transfer information from the first party, wherein the transfer information includes a third party identifier, a second party identifier and the amount, wherein the second party associated with the first party is selected from a set of possible second parties in a database;
   analyzing the transfer information;
   determining an enhancing amount generated from a profile of the second party to transfer from the second party to the third party; and
   transferring money corresponding to the amount and the enhancing amount to a stored value fund associated with the third party.

2. The method for electronically transferring the amount money from the first party to the third party where the amount is enhanced by the second party as recited in claim 1, wherein the transferring money step comprises steps of:
   transferring a first amount corresponding to the amount; and
   transferring a second amount corresponding to the enhanced amount.

3. The method of claim 2, wherein transferring the second amount comprise automatically transferring the second amount from a second stored value fund, the second stored value fund associated with the second party.

4. The method for electronically transferring the amount money from the first party to the third party where the amount is enhanced by the second party as recited in claim 1, further comprising a step of producing a gift matching form, whereby the gift matching form is used by the second party.

5. The method for electronically transferring the amount money from the first party to the third party where the amount is enhanced by the second party as recited in claim 1, further comprising a step of producing a tax receipt for at least one of the first party and the second party.

6. The method for electronically transferring the amount money from the first party to the third party where the amount is enhanced by the second party as recited in claim 1, further comprising:
   notifying the first party that transfer of the amount did not clear; and
   notifying at least one of the first and second parties that the enhancing amount was not transferred.

7. The method for electronically transferring the amount money from the first party to the third party where the amount is enhanced by the second party as recited in claim 1, wherein correspondence between the transferred money and a sum of the amount and the enhancing amount varies by a fee.

8. The method for electronically transferring the amount money from the first party to the third party where the amount is enhanced by the second party as recited in claim 1, further comprising a step of receiving a fee from at least one of the first, second and third parties.

9. The method for electronically transferring the amount money from the first party to the third party where the amount is enhanced by the second party as recited in claim 1, further comprising steps of:
   receiving a future time from the first party; and
   transferring the amount at the future time.

10. The method for electronically transferring the amount money from the first party to the third party where the amount is enhanced by the second party as recited in claim 1, further comprising steps of:
receiving a future time from the second party; and
transferring the enhancing amount at the future time.

11. The method for electronically transferring the amount money from the first party to the third party where the amount is enhanced by the second party as recited in claim 1, further comprising a step of receiving a delivery address for delivery of the transferred money.

12. The method for electronically transferring the amount money from the first party to the third party where the amount is enhanced by the second party as recited in claim 1, further comprising steps of:
receiving first identity verification information from the first party that is used to verify an identity of the third party;
receiving second identity verification information from the third party; and
processing the first and second identity information to validate the identity of the third party.

13. The method for electronically transferring the amount money from the first party to the third party where the amount is enhanced by the second party as recited in claim 1, wherein the transferring money step comprises a step of transferring money from at least one money handler.

14. The method for electronically transferring the amount money from the first party to the third party where the amount is enhanced by the second party as recited in claim 13, wherein the money handler includes at least one of a bank, a credit card company, a debit card company, a retail location, a stored value fund, a gift certificate issuer, an electronic gift certificate issuer, and a money order issuer.

15. A computer-readable medium having computer-executable instructions for performing the method recited in claim 1.

16. The method of claim 1, further comprising receiving payout instructions from the third party.

17. The method of claim 1, wherein the payout instructions comprise instructions to transfer a designated amount of money from the stored value fund to one of a retail location, a prepaid debit card, a prepaid credit card, a bank account, a negotiable instrument, and a gift certificate.

18. The method of claim 1, wherein the stored value fund associated with the third party includes at least two different currencies of money.

19. A method for electronically transferring money, the method comprising steps of:
receiving transfer information from a first party, wherein the transfer information comprises a third party identifier, a second party identifier and a first amount, wherein the second party associated with the first party is selected from a set of possible second parties in a database;
analyzing the transfer information;
determining a second amount generated from a profile of a second party to transfer from the second party to a third party, wherein the second amount is algorithmically related to the first amount;
checking the second amount;
transferring a third amount corresponding to the first amount to the third party; and
transferring a fourth amount corresponding to the second amount to the third party, based at least in part on results of the checking step, the fourth amount transferred from a stored value fund associated with the second party.

20. The method for electronically transferring money as recited in claim 19, wherein the checking step comprises a step of automatically determining if the second amount is within a predetermined criteria specified by the second party.

21. The method for electronically transferring money as recited in claim 19, wherein the checking step comprises a step of seeking assent from the second party that the second amount is correct.

22. The method for electronically transferring money as recited in claim 19, further comprising a step of generating a matching form.

23. The method for electronically transferring money as recited in claim 22, further comprising a step of providing the matching form to the second party.

24. A computer-readable medium having computer-executable instructions for performing the method recited in claim 19.

25. A method for electronically transferring money, the method comprising steps of:
receiving transfer information from a first party, wherein the transfer information comprises a third party identifier, a second party identifier and a first amount, wherein the second party associated with the first party is selected from a set of possible second parties in a database;
determining a second amount generated from a profile of a second party to transfer from the second party to the third party, wherein the second amount is algorithmically related to the first amount;
checking the second amount against a predetermined criteria;
transferring a third amount corresponding to the first amount to the third party; and
automatically transferring a fourth amount corresponding to the second amount to the third party, based at least in part on results of the checking step.

26. The method for electronically transferring money as recited in claim 25, wherein the variance between at least one of the first and third amounts and the second and fourth amounts is equal to a fee.

27. A computer-readable medium having computer-executable instructions for performing the method recited in claim 25.

* * * * *